July 22, 1924.

W. THREADGILL

MACHINE FOR PICKING COTTON

Filed June 11, 1920   6 Sheets-Sheet 1

1,502,216

Wilmer Threadgill INVENTOR.

BY

Percy H. Moore ATTORNEY.

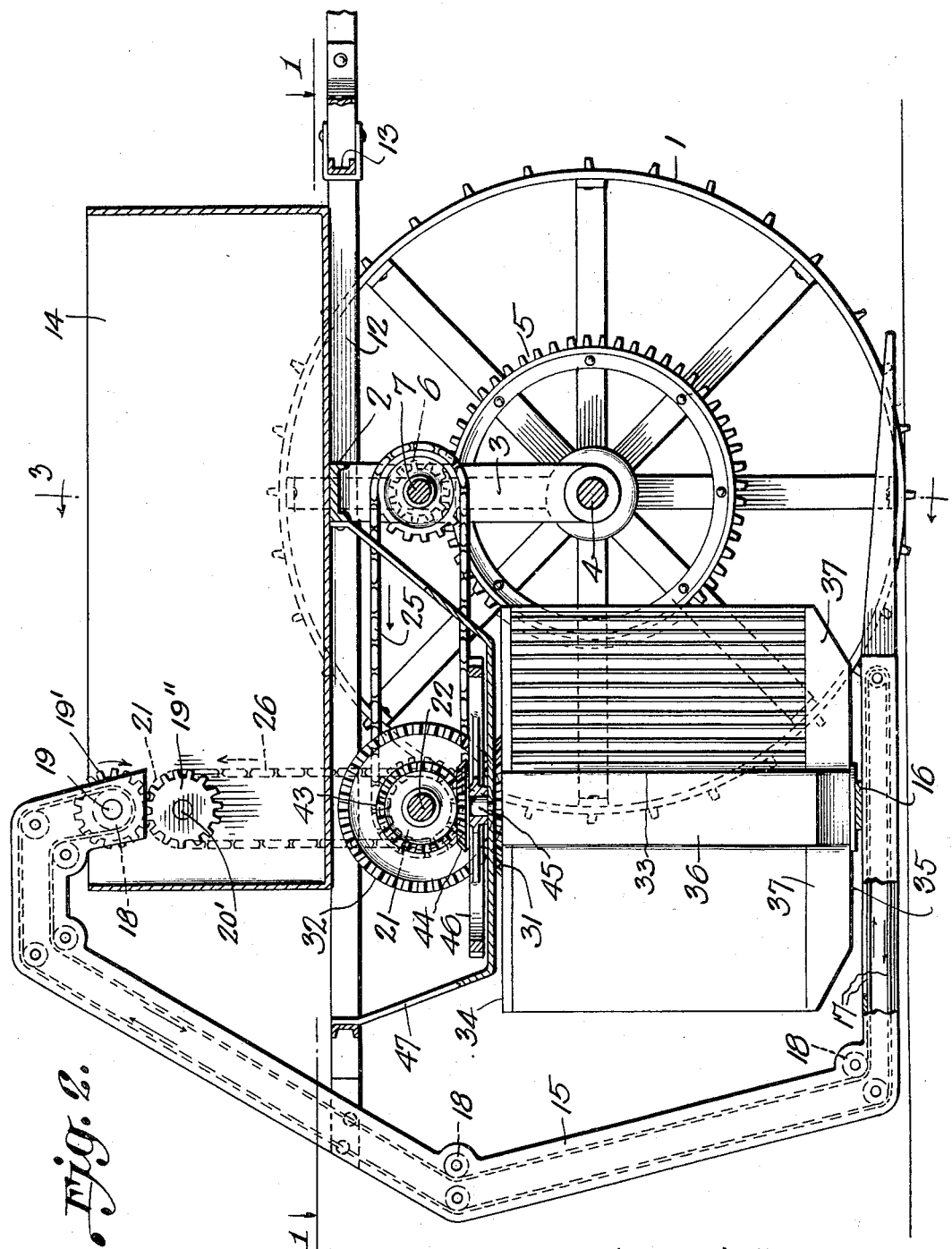

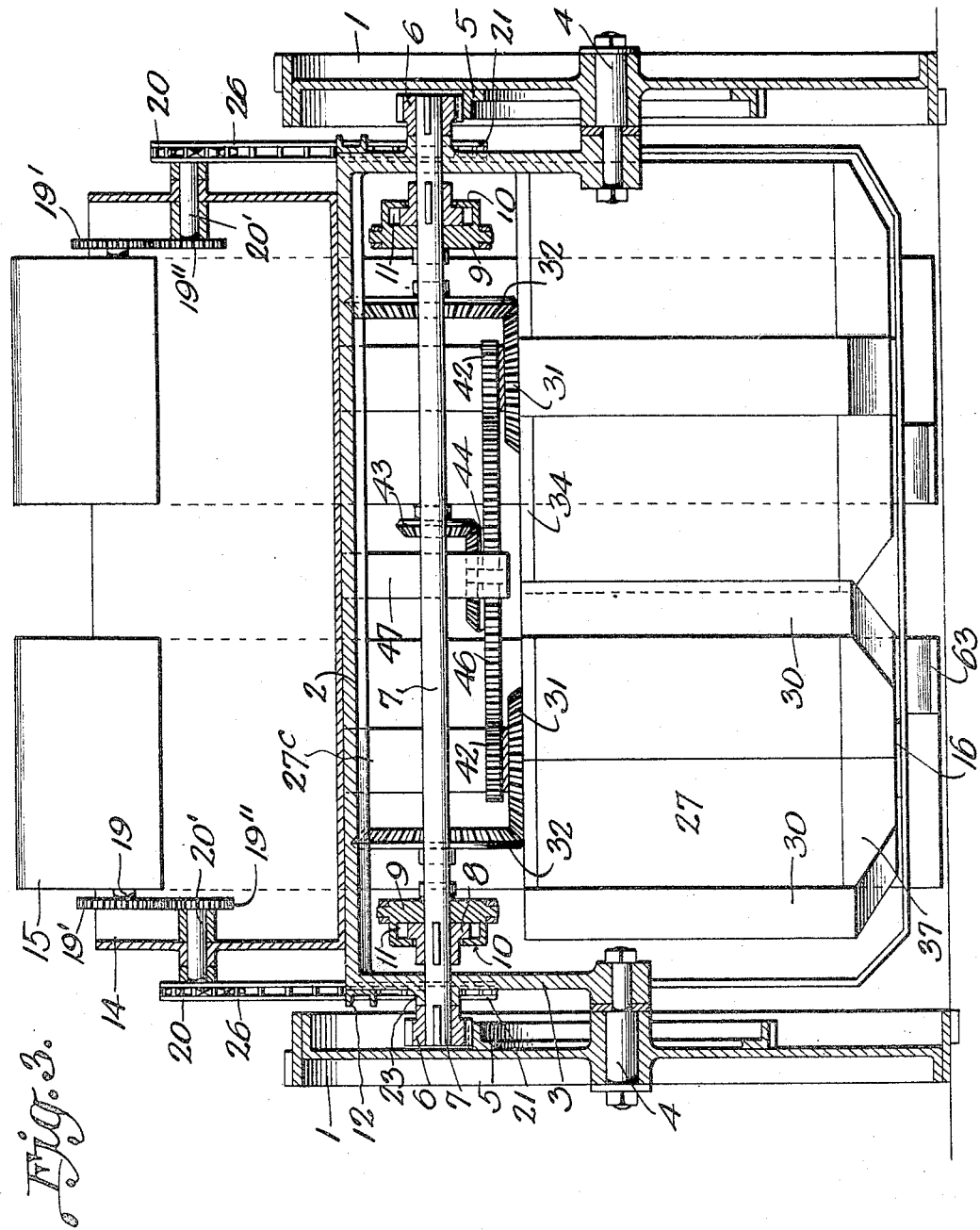

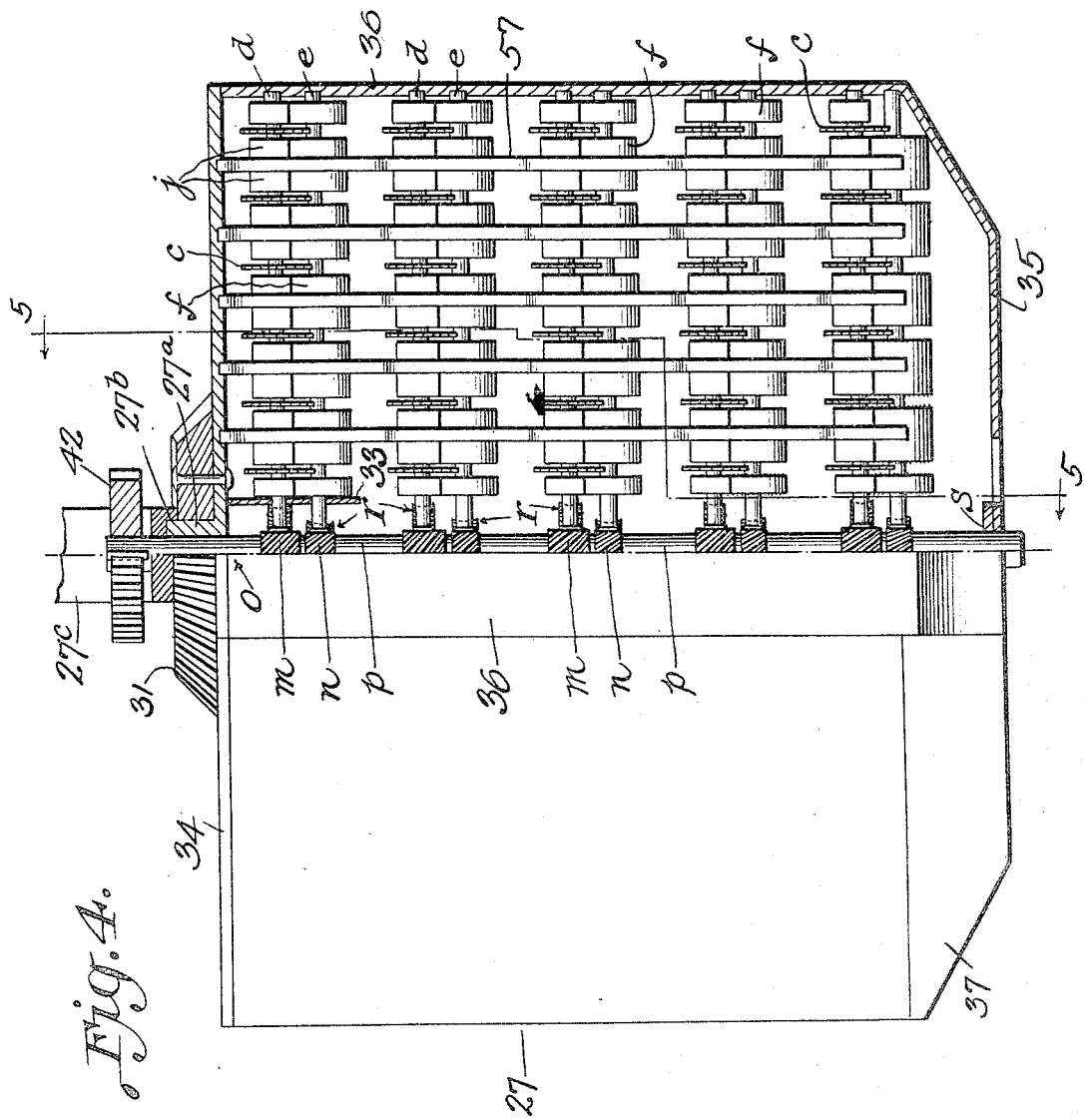

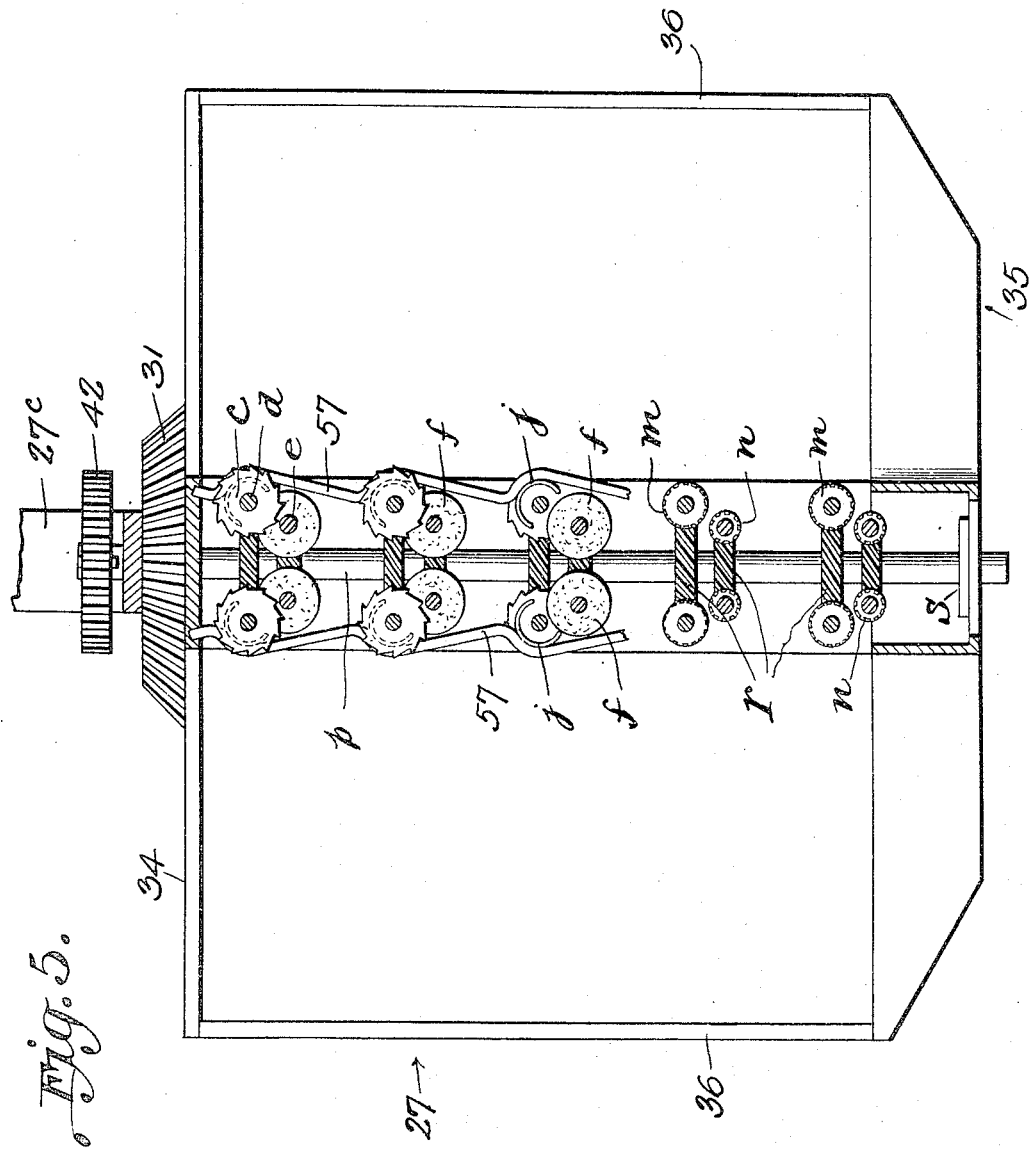

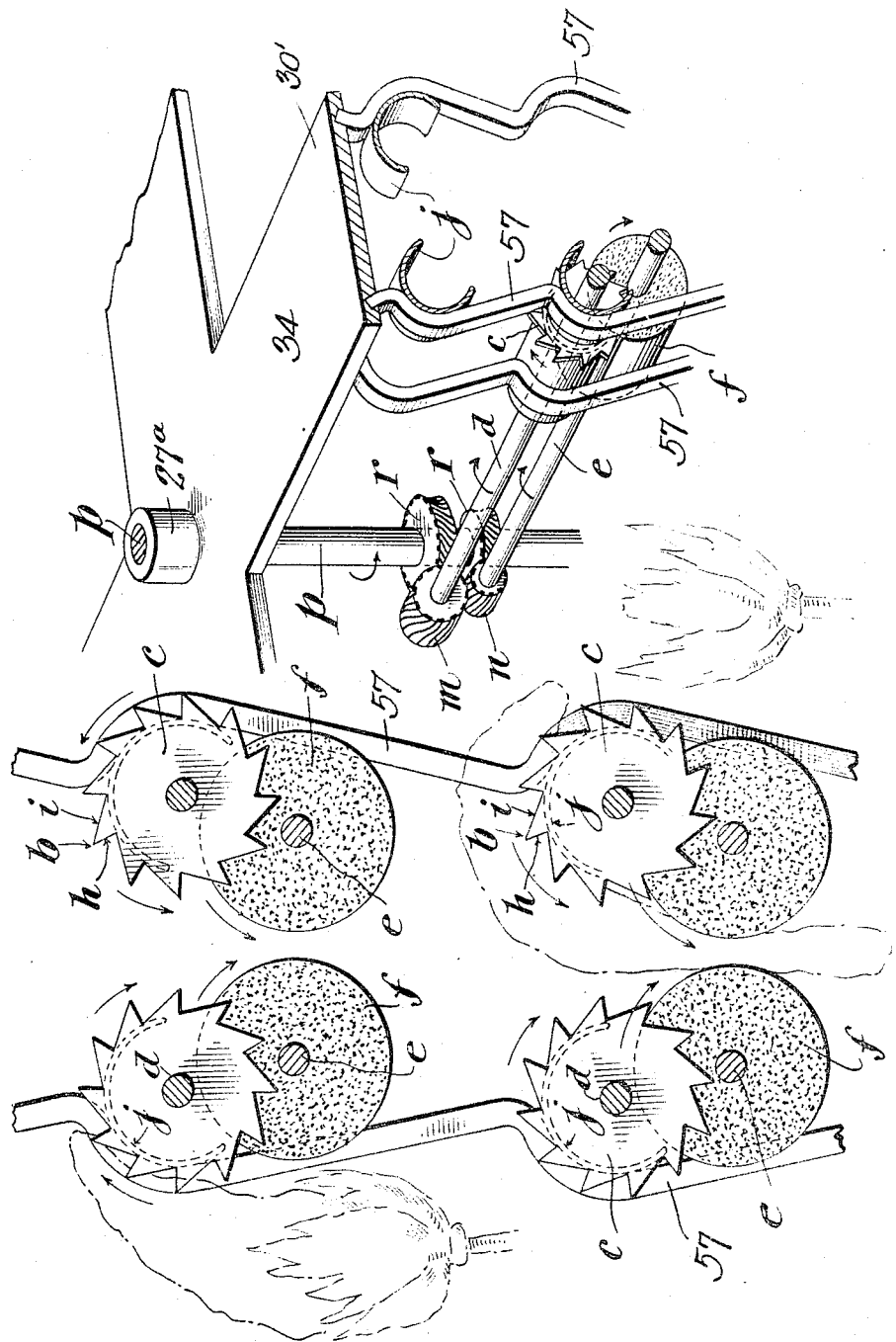

Patented July 22, 1924.

1,502,216

UNITED STATES PATENT OFFICE.

WILMER THREADGILL, OF LAREDO, TEXAS.

MACHINE FOR PICKING COTTON.

Application filed June 11, 1920. Serial No. 388,279.

*To all whom it may concern:*

Be it known that WILMER THREADGILL, a citizen of the United States of America, residing at Laredo, in the county of Webb and State of Texas, has invented certain new and useful Improvements in Machines for Picking Cotton, of which the following is a specification.

This invention relates to improvements in cotton pickers, particularly to improvements upon the subject-matter of my co-pending application filed March 6, 1919, Serial No. 281,012, since patented, the patent being dated May 18, 1920, No. 1,340,557.

The invention has for its object primarily to provide for facilitating the removal or eliminating of the cotton-fibre and seeds from the plants, particularly in cooperation with what I term the frames or fenders in said copending application; and to expedite the disposition or conveying the resultant separations in the most advantageous or effective manner.

A further object of my invention is to provide for carrying out the aforesaid purposes in a simple and expeditious way.

Other objects of the invention will be apparent from the following disclosures of the construction, arrangement and operation thereof.

The invention consists therefore of certain instrumentalities and features of construction substantially as hereinafter more fully set forth and pointed out by the appended claims.

The accompanying drawings disclose the referred to embodiment or one example of my invention, wherein it will be understood that various changes and modifications as relates to the detailed construction and arrangement of parts may be made without departing from the spirit or scope of the invention as covered by the claims and in which drawings:

Figure 2 is a vertical longitudinal sectional elevation of the same;

Figure 3 is a vertical transverse sectional elevation thereof;

Figure 4 is a partial side elevation and sectional view, showing more especially the picker frame or fender and the spiral-intergeared actuating mechanism of the cotton-pickers adapted for speeding the feeding of the cotton and fibre conveyer rotary members or rollers with respect to the cotton pickers;

Figure 5 is a view, showing more specifically the construction and arrangement of the picker-teeth and the cleaners therefor and the relation one with respect to the other;

Figure 6 is an enlarged fragmental view of my invention disclosing more fully certain parts referred to in Figure 5; and Figure 7 is a detail perspective view.

Figure 1:
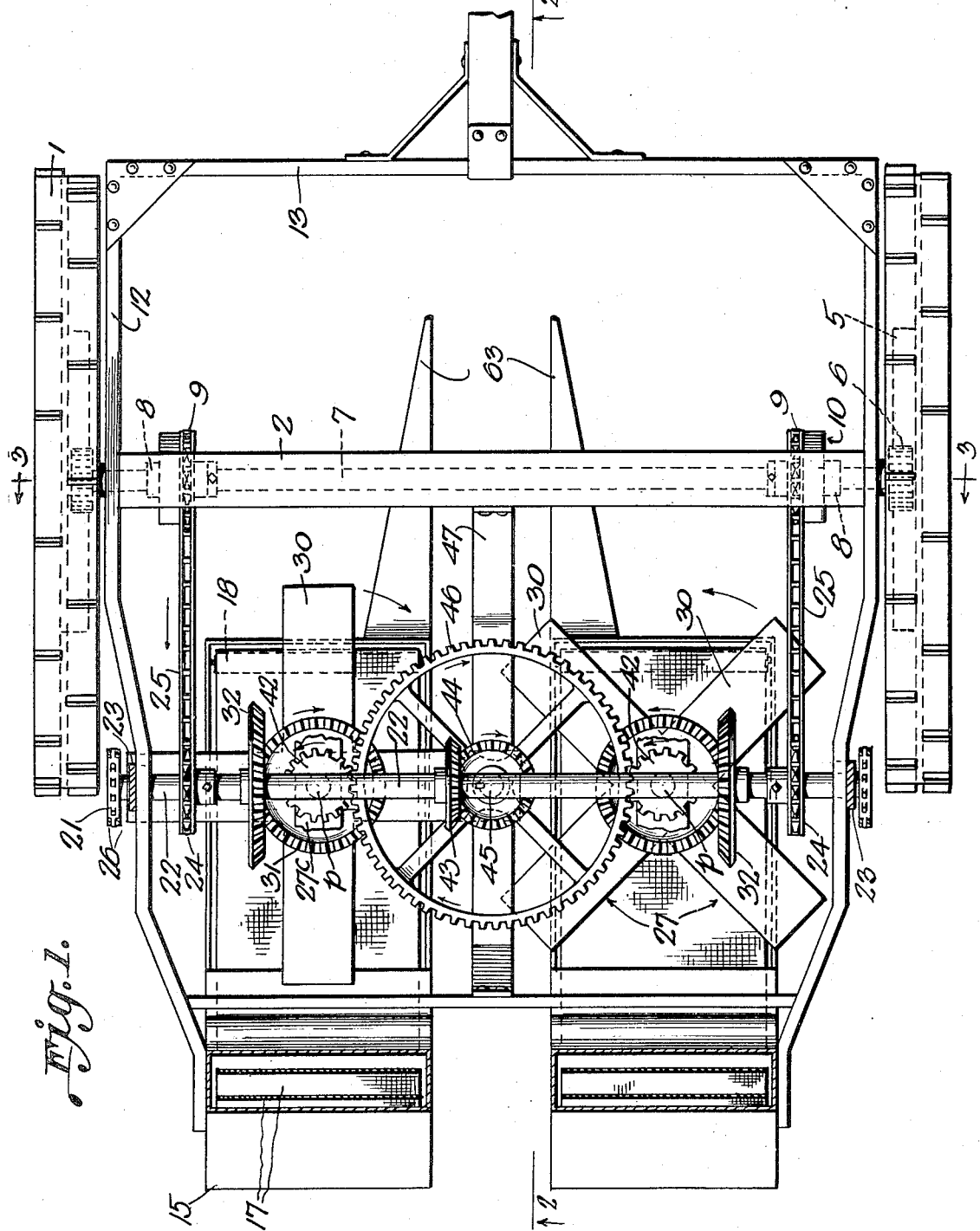
Figure 1 is a plan view of my improved cotton picker.

Referring more particularly to the drawings, wherein like reference numerals designate similar parts in each of the figures, the numeral 1 refers to the supporting wheels, and the numeral 2 refers to the axle which latter is of inverted U-shape form, having its downwardly extending arms 3 provided with spindles 4, whereon the wheels 1 are mounted. The wheels 1 are provided with spur gears 5, fixed to the spokes thereof, on the inside, said spur gears being in mesh with corresponding spur gears 6, which are fixed upon the ends of a transverse main shaft 7, said shaft being rotatable in suitably aligned bearings in the arms 3 of the axle 2. Splined upon the main shaft 7 are ratchet wheels 8, and loosely mounted upon said shaft are sprocket wheels 9, said sprocket wheels having annular turned down flanges 10 adapted to retain said ratchet wheels against inadvertent displacement, said sprocket wheels to rotate with the main shaft 7 but to disengage when the machine is moved backwardly to permit the shaft 7 to run idly with respect to the sprocket wheels 9. A suitable framework is provided, including suitable side members 12, connected at their forward ends by a bar 13, said framework being fixed to the axle 2 for supporting the operating mechanism; and mounted on this framework is a suitable receptacle 14 which receives the picked cotton, said cotton being delivered to said receptacle through elevator-chutes 15 preferably of the structural outline disclosed in my application herein referred to. The lower ends of these chutes are arranged horizontally underneath the machine and are fastened to and suspended from the framework; said chutes extending upwardly around the rear end of the machine and having their upper discharge ends turned downwardly into the receptacle 14. Within these chutes are contained endless travelling aprons 17 which travel upon antifriction rollers 18 rotatably mounted in the chutes, and fixed upon the shaft 19 are rollers 18' through which power and motion are communicated to the aprons 17.

Fixed upon the shaft 19 at its ends are spur gears 19' and in mesh with the latter are spur gears 19" which are positioned upon the shafts 20', and likewise arranged on shafts 20' are sprocket wheels 20 which are in alignment with corresponding sprocket wheels 21 which are fixed upon the countershaft 22 at its ends. This countershaft is rotatably mounted in suitable bearings 23 depending from the framework; and driven from the main shaft 7 by means of sprocket chains 25 and motion is imparted through a sprocket chain 26 passing over the sprocket wheels 20 and 21 to the spur gear 19", then through the spur gears 19', and then to the rollers 18' upon the shaft 19, the travelling aprons being thereby caused to revolve in the direction indicated by the arrows in the illustration of the chutes in Figure 2. The horizontal portions of the chutes 15, are open above to expose the aprons 17 to the fibre; and the cotton, gathered from the plants in the manner hereinafter described, falls upon said aprons and is then conducted upwardly through the chutes and delivered into the receptacle 14.

The picker frames 27 are suitably mounted rotatably in end bearings 16 at the bottom in the framework, and fixed at the top in a socket 27ª fixed to the picker frame and revolving inside of a bearing 27ᵇ in a suitable bracket 27ᶜ fixed to and depending from the framework, said bearing and socket being suitably supported in position from the latter. These picker frames as shown in Figures 1 and 3 comprise oppositely disposed radial wings 30, which are arranged on opposite sides of the central line of the machine and are geared to rotate in the direction indicated by the arrows in Figure 1. The upper ends of these picker-frames have bevel-gears 31 fixed thereon, which are in mesh with corresponding bevel gears 32 which are fixed to the shaft 22. The gearing is such that the picker-frames rotate at about the same rate of speed as the traction wheels 1 travel forward, so that as the machine moves along the row of plants, the extremities of the wings will have little or no rearward nor forward movement relative to the plants between which the picker frames pass, whereby the plants will be only slightly agitated by contact with the frames and will be comparatively uninjured, thus preventing leaves and broken limbs being gathered therefrom and the plants bruised during the picking operation. The picker-frames are so arranged relative to each other that, as they rotate, the wings of the one picker frame will pass between the wings of the other picker frame, thus permitting the frames to rotate freely without coming into contact with each other and with comparatively little injury to the plants in the row.

The picker frames 27 are preferably substantially rectangular in general outline and include the side walls 33 suitably secured together, and the top 34 and the bottom 35 which are suitably anchored to said side walls having the radial extensions 30ª, forming the top portions of the wings 30; and these wings are formed with vertical end walls 36. The lower ends of these wings are formed with hoppers 37 which converge downwardly and conduct the picked cotton into the elevating chutes 15. Each picker frame has a vertical shaft $p$ at its center, having bearings S inside the picker frame at the bottom thereof, and having bearings in the socket 27ª at the center of the top of the picker frame, said shaft $p$ having fixed thereto the spur gear 42 which is in mesh with the large spur gear 46 which is fixed to the short vertical shaft 45; this shaft 45 is held in place by suitable bearings in the bracket 47 which is fastened to the frame work of the machine. Fixed upon the short shaft 45 is the bevel gear 44 which is in mesh with the corresponding bevel gear 43, which is fixed upon the shaft 22 and by means of this shaft 22 these bevel gears are furnished power which is transmitted through the short shaft 45 to the large spur gear 46 and then by gear 46 to the small spur gear 42 and by the latter to the vertical shaft $p$. Arranged upon shafts $p$ (see Figures 4 and 5) are spiral gears $r$ which are in mesh with a spiral gear $m$ and a smaller spiral gear $n$, said spiral gears $m$ and $n$ being fixed upon transverse shafts $d$ and $e$ respectively which are arranged in vertical series, and extend transversely entirely across the picker frames and have bearings in the walls 33 and in the end plates 36 and carry fixed thereto cotton pickers $c$ which are located intermediate said walls and end-plates and what may be termed a " grating " hereinafter described.

It will be observed that by means of the intergeared mechanism, including the differently diametered or larger and smaller spiral gearings $r$, $m$ and $n$ effecting connection between the shafts $p$ and the shafts $d$ and $e$ carrying the pickers $c$ and the cleaner rollers $f$, said rollers are adapted to rotate faster than the pickers in order to increase the conveying action of the cleaner rollers to prevent accumulations of the picked cotton and thus insure the effective cleaning of the picker-teeth and accordingly effect the orderly removal of the cotton and the fibrous material to their respective separate points of delivery. These pickers $c$ which are preferably of general circular saw like outline, each By speeding the rollers faster than the pickers another distinct feature and advantage is gained and the cleaning process is greatly improved.

The hood which hangs over the picker shaft and prevents the cotton from falling off the teeth down upon the picker shaft and wrapping around the shaft is of value.

The smooth surface of the bases of the cleaner roller or cylinders might be sufficient to sluff off the cotton from the pickers, though the addition of the bristles or hairs or the like, or even a slight roughness of the base surfaces, adds a great deal to the effectiveness of the process. This arrangement of having a fibrous or bristled surface to clean the teeth and then so very near the same a smooth or hard side surface to the rollers which will not tangle the fiber but will convey it and stay clean of cotton fiber accumulations, I find useful. The bristles might radiate in any direction, either horizontal or perpendicular to or otherwise disposed with relation to the picker blades. The narrowness of the spaces into which the picker blades pass is a valuable feature and is such that the lint, when bunched with other lint, will not enter the crevices between the cylinder roller bases of the cleaners nor be entangled upon the bristles while the lint is in process of being conveyed by the pairs of rollers pressing upon it and forcing it along. There are other features which might be brought out by further comment but in the case of the features mentioned an omission of one or more of them will not necessarily render impossible or inoperative the rest of the features.

What I claim is:

1. In a cotton-picking machine, a rotary picker element, and a pair of conveyer cylinders positioned on opposite sides of the picker element and having their ends which face said element provided with doffing means.

2. In a cotton-picking machine, a pair of conveyer cylinders arranged in endwise spaced relation and having their adjacent ends provided with doffing means, and a rotary picker element positioned to have its working portion enter the space between said ends of the cylinders for engagement by the doffing means.

3. In a cotton-picking machine, a pair of conveyer cylinders arranged in endwise spaced relation and having their adjacent ends provided with doffing means, and a toothed rotary picker-element positioned to have its teeth enter the space between said cylinder ends for engagement by the doffing means.

4. In a cotton-picking machine, a rotary picker element, a shaft carrying said element, a guard hood on opposite sides of the picker element above the shaft, and a pair of conveyer cylinders positioned on opposite sides of the picker element below the shaft, and having their ends which face said element provided with doffing means.

5. In a cotton-picking machine, a rotary picker element, and a pair of cylinders positioned on opposite sides of the picker element, said cylinders having their ends which face said elements provided with doffing means, and their peripheries adapted to convey the doffed material.

6. In a cotton-picking machine, a pair of laterally spaced rotary picker elements, and a pair of cylinders positioned on opposite sides of each picker element and having their ends which face said elements provided with doffing means, the respective pairs of cylinders being parallel and rotatable in opposite directions to receive therebetween and convey the material doffed from the picker elements.

7. In a cotton-picking machine, a pair of laterally spaced rotary picker elements, and a pair of cylinders positioned on opposite sides of each picker element and having their ends which face said elements provided with doffing means, the respective pairs of cylinders being parallel and rotatable in opposite directions to receive therebetween and convey the material doffed from the picker elements, said cylinders rotating in the same direction as and at a higher speed than the picker elements.

8. In a cotton picking machine, the combination of a rotary toothed picker and a rotary cleaner, both having the same direction of rotation and means adapted to effect the rotation of the cleaner and picker, said cleaner having its brushing surface adapted to engage and remove the deleted cotton beyond the reach of the picker-teeth.

9. In a cotton picking machine, the combination of a rotary toothed picker and rotary cleaners arranged upon opposite sides of said picker and having the same direction of rotation, means adapted to impart the required rotation to said picker and said cleaners, said cleaners having their brushing surfaces arranged to engage the deleted cotton beyond the reach of the picker teeth.

10. In a cotton picking machine, the combination of a rotary toothed picker and a rotary cleaner, and means for causing the rotation of both the picker and the cleaner in the same direction and that of the cleaner at an increased speed with respect to that of the picker said cleaner having a brushing surface for removing the deleted cotton from the picker.

11. In a cotton picking machine, the combination of a rotary toothed picker, a rotary cleaner, means for causing the rotation of both the cleaner and the picker in the same direction and that of the cleaner at an inpicker having peripheral teeth, including a point b, and edges or walls designated as h and i, project out through and revolve within the interstices between the parts of a grating for engaging the fiber of the plants and extracting the same therefrom. These teeth may be of any desired form a preferred form however adapted for best service is such as will have its shorter or initially engaging wall or edge h in the line or radius, or nearly so, of the center of its circle of movement it assumes in effecting the picking action, whereby the points or apices of the teeth will be prevented from first digging into the cotton, the edges or bases h of the teeth being arranged to initially come into contact with the cotton, which, experience has demonstrated to be the most advantageous presentation of the teeth to the cotton. The wings of the picker frame are provided in each side with "grating" or cage-work 57, which may be of any suitable shape or form, but preferably are formed of vertically extending rods 57' which are fastened at their upper and lower ends to the upper and lower parts of the picker frame respectively. These rods are suitably spaced or intersticed apart and may be formed as shown, into successive arcuate outlines or sections so as to conform to the contour of, and fit closely around the outer sides of the ranks or courses of the teeth, the picker teeth being passed through the interstices or spaces provided between these rods so as to pull the cotton through said interstices of the "grating" and over the tops of the pickers c are provided hoods j; fastened to the cage-work and extending inwardly from the cage-work over the cleaners f, over which the cotton is pulled by the pickers.

The shafts d and e have fixed thereto the spiral gears m and n respectively and extend entirely across transversely through the picker frame and having bearings in the walls 33 and in the end plates 36. Fixed upon these shafts d and e between the end walls 36 and the side walls 33 are the cleaner rollers f, which are rotatable from the shafts e. These rollers are spaced close together upon the shaft e, but far enough apart to allow the application thereto and therebetween of short bristles or hairs or a roughened surface and the like and also to admit the picker-blades and teeth; these bristles or hairs or the like cover ends or heads of the cleaner cylinders or rollers and, when the rollers are in action, serve to brush the picker teeth by an abrading action as before indicated; the cylindrical surfaces of the cylinder rollers may be fluted or plain and will serve to convey the fiber after the delivery of the same by the pickers. The cleaner rollers are arranged so that the roller of equal elevation on one side of the picker-wing will run near to or cooperate with the corresponding roller on the opposite side of the picker-wing, so as to act as a conveyer downwardly of the cotton as shown in Figure 6. The cleaner rollers operate to convey the cotton in a direction from the outside over inwardly so that the top surface of the cleaner roller runs in the same direction as the picker teeth when the teeth are passing in a direction over the top of the picker shaft and the pickers and cleaners travel in the direction as indicated in Figure 6. The cotton fiber and seed caught by the picker-teeth will be carried upwardly and back through the cage-work over the hood and be brushed or swept or forced from the teeth by the cleaner-rollers and carried to the point of contact between the rollers upon each side of the wing of the picker-frame and by the action of the rollers in pairs be swept or conveyed downwardly to the hoppers and by the action of the converging bottoms of the hoppers rolled on to the travelling aprons and by the aprons be carried up through the chute 15 and be deposited into the receptacle 14. Forwardly extending and lifting guides 63 project from the frame-work in front of the picker-wings for the purpose of guiding the plants and lifting fallen limbs so that the limbs of the plants will pass orderly between the wings of the picker-frames.

Among the especially important and characteristic features of my present improvements, as respect the prior art may be mentioned the following:

The structure of the tooth, which hooks forward enough to take hold of the lint and yet not hooked enough to prevent the lint from being sloughed off by the cleaner. The point of maximum efficiency seems to be when the short side or edge of the tooth is in a straight or radial line passing through the center of the picker shaft, though use may develop a variance from this; otherwise results attained as herein set forth would not be realized.

The feature of the blades (picker-teeth) passing between the rollers (between the bases of the roller cylinders). The teeth could be cylindric or slender, as well as flat, so long as they are shaped to enter between these cylinder cleaners.

The cleaner-rollers, in having the same direction of rotation (running up over inward) as the picker teeth. Especially valuable is the arrangement of the rollers so as to feed downward (in pairs) and at the same time serve as cleaners for the pickers, and in such a way as to throw the cotton off the picker teeth just at the right point and to get in and sweep from the tooth base outward or forward. They do the sweeping and then aid the sweeping by (working in pairs) conveying the clumps of cotton fiber away to get same out of reach of the teeth.

creased speed with respect to that of the picker, said picker being contoured circular saw fashioned, having the initially engaging walls of its teeth adapted for presentation to the cotton in advance of the points of the teeth to obtain the maximum efficiency of penetration of the teeth points into the cotton.

12. In a cotton picking machine, the combination of a rotary toothed picker, rotary cleaners, means for causing the rotation of both the picker and the cleaner in the same direction and that of the cleaner at an increased speed with respect to the rotation of the picker, an enclosure of cage-work formation, a hood adapted to guard or protect said rotary cleaners and the deleted cotton, and a container, said rotary picker and rotary cleaners adapted to function for delivering the deleted cotton into said container.

13. In a cotton picking machine, the combination of a rotary toothed picker, a rotary cleaner, differential-speed-gear and driving shaft mechanism adapted to cause the rotation of said cleaners at an increased rate of speed with respect to the speed of said picker, an enclosure of cage-work formation, a hood adapted to guard or protect said rotary cleaners and the deleted cotton, and a container, said rotary picker and rotary cleaners adapted to deliver the deleted cotton into said container.

14. In a cotton-picking machine, the combination with a rotary toothed picker, of an elongated cylindrical rotary conveyer having rotation in the same direction as the picker, means for effecting the rotation of said picker and cleaner, said cylindrical conveyer element having narrow-slits therein arranged in planes parallel to the plane of the cylinder-base, said slits admitting therethrough the picker element, said slits also being provided with roughened walls for removing the deleted cotton from said picker-element.

15. In a cotton-picker, the combination with a rotary picker element of a fender, rotary opposed cleaner elements adapted to receive therebetween the aforesaid picker element, said fender being adapted to allow of the aforesaid picker element withdrawing the cotton therethrough into the cotton picker proper.

In testimony whereof I affix my signature in presence of two witnesses.

WILMER THREADGILL.

Witnesses:
  Ed. Russell,
  C. J. O'Banion.